UNITED STATES PATENT OFFICE 2,509,517

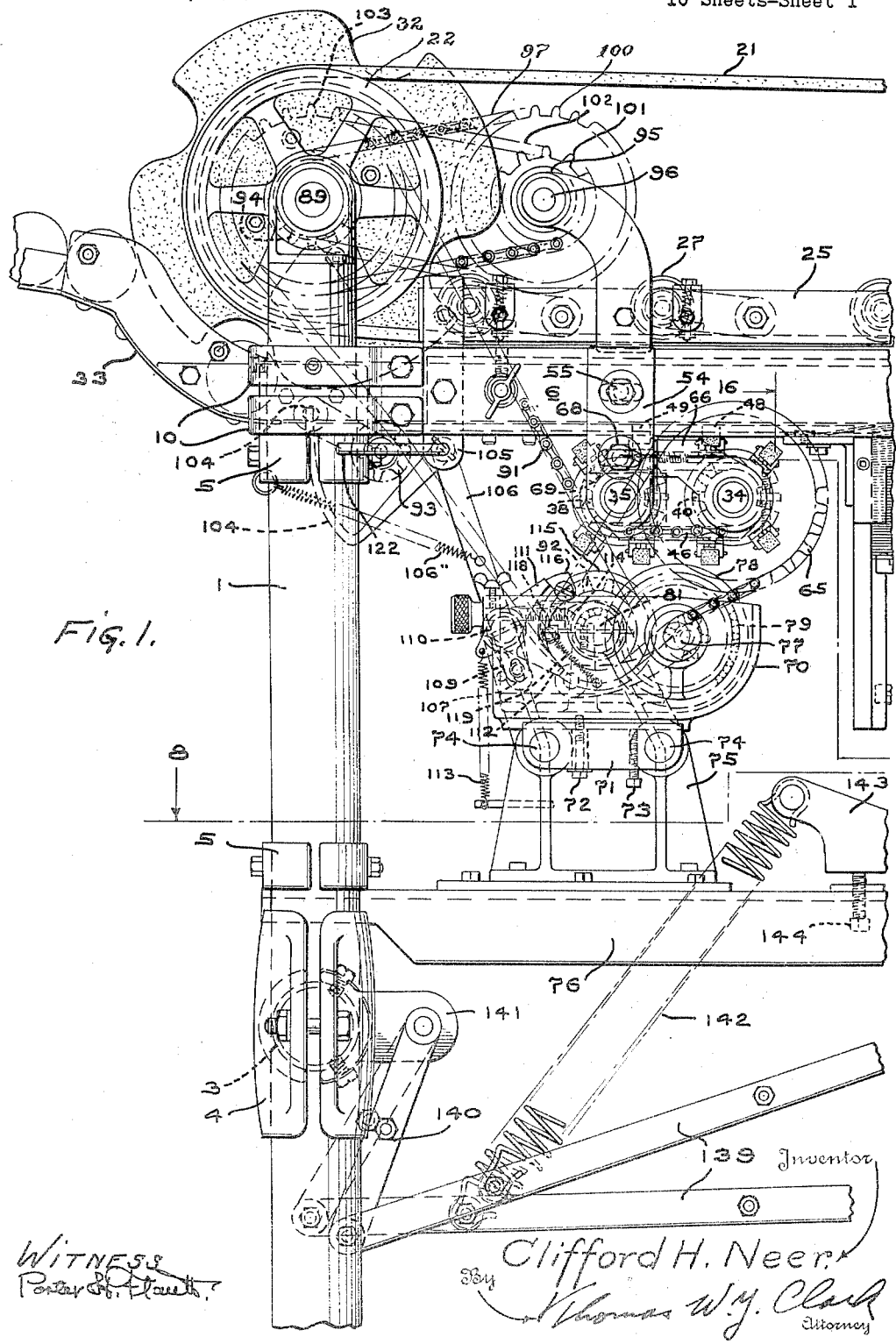

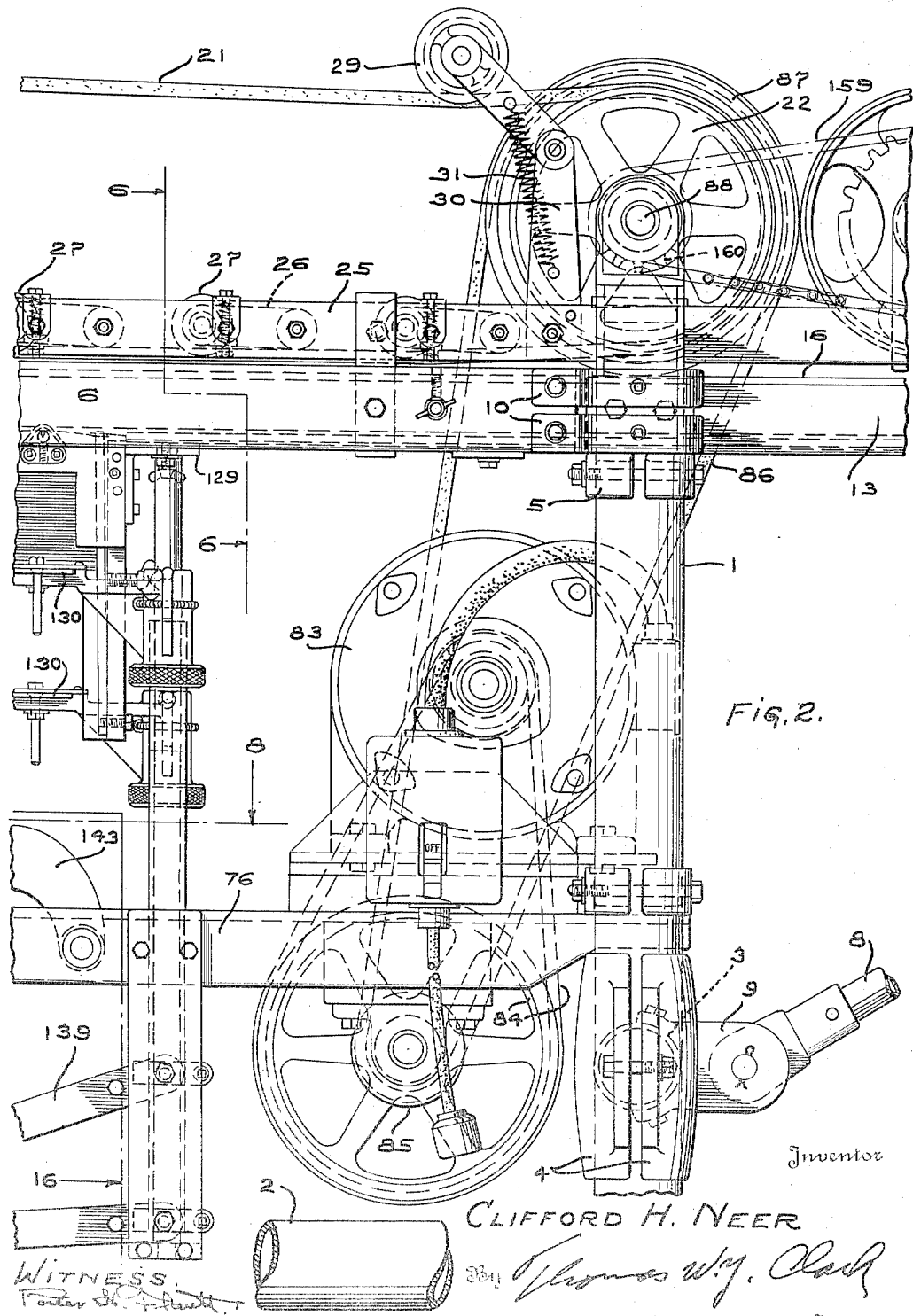

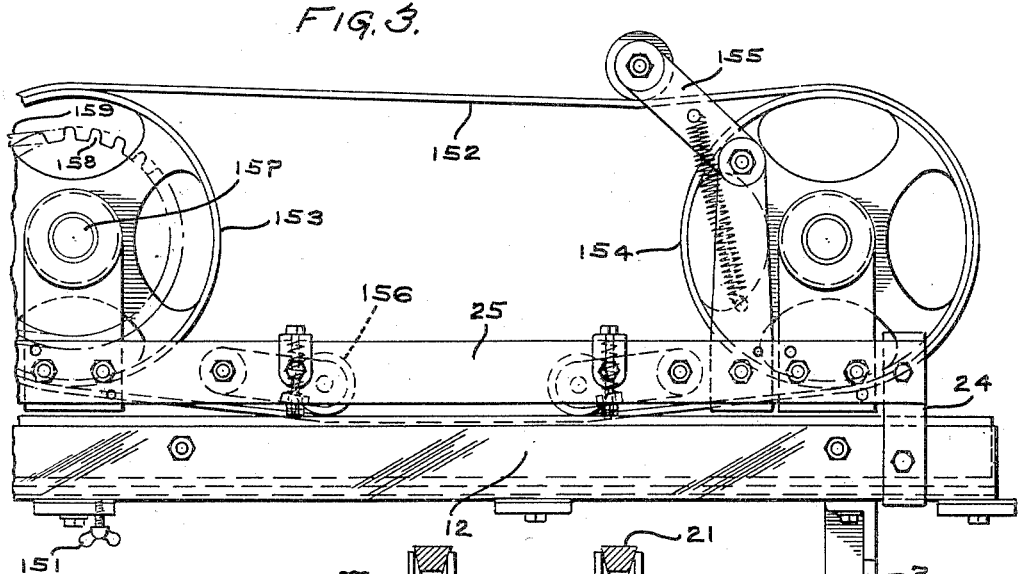
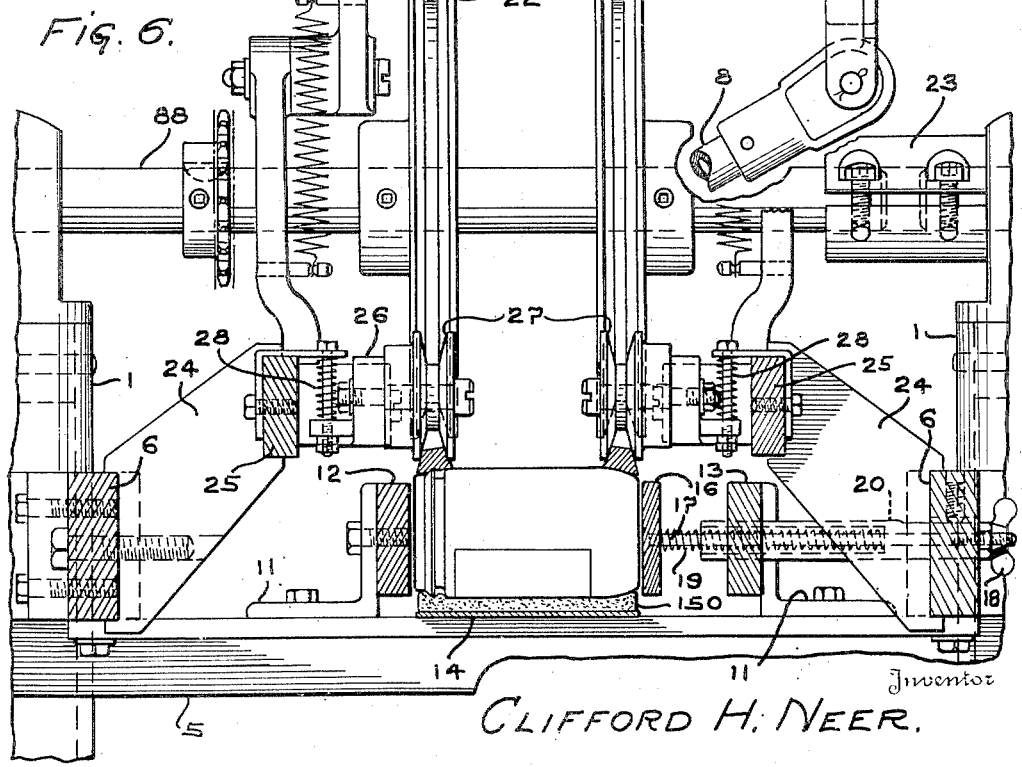

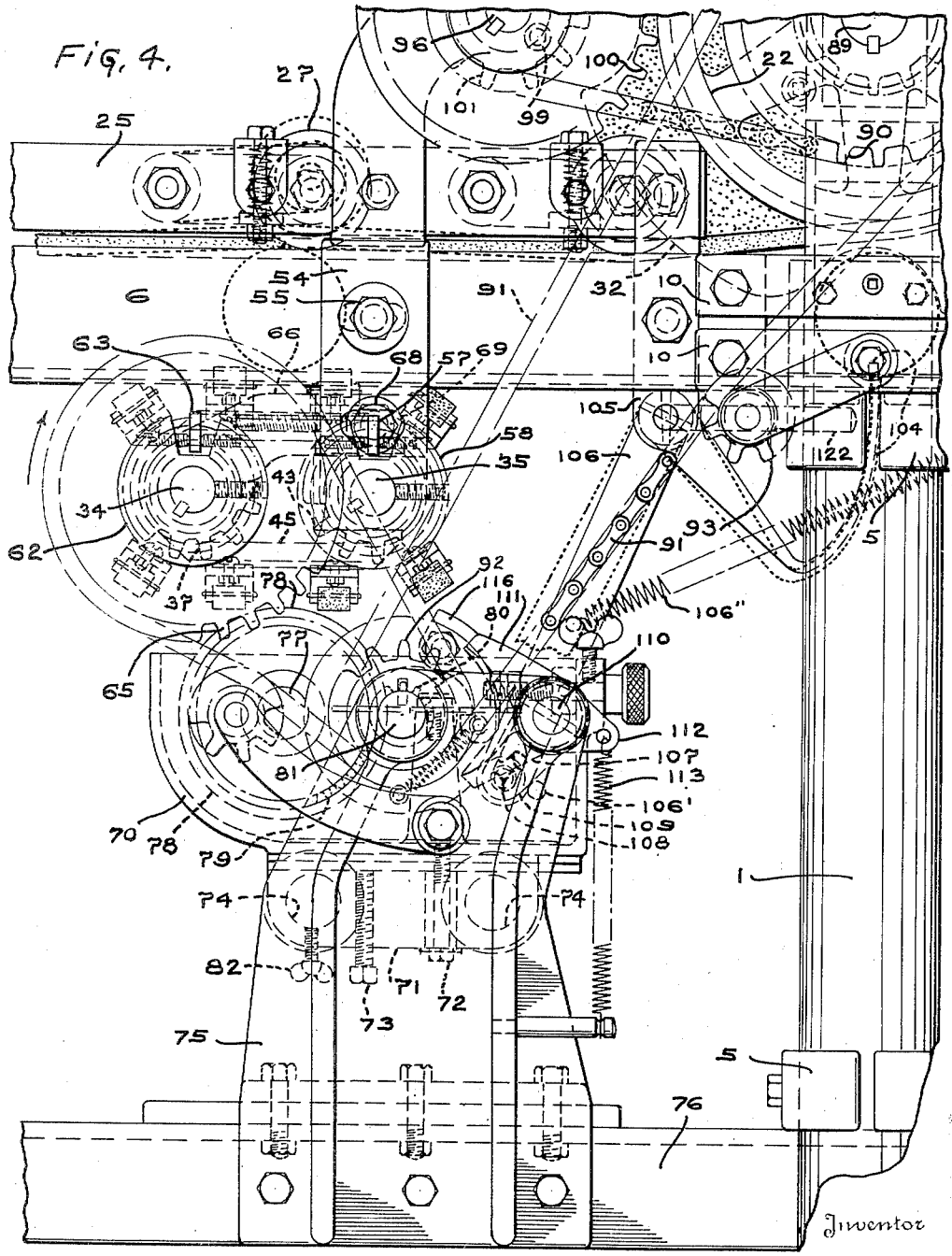

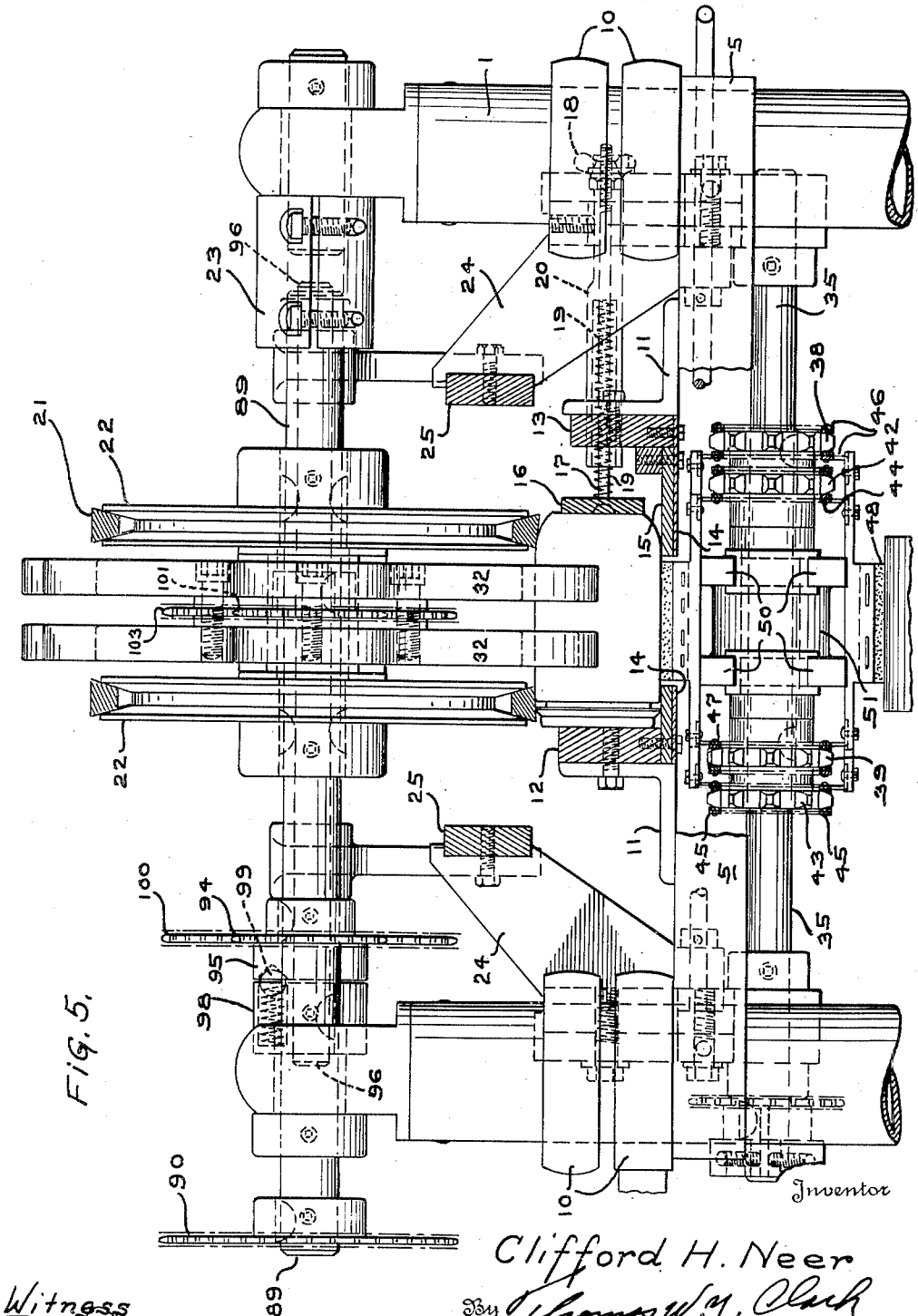

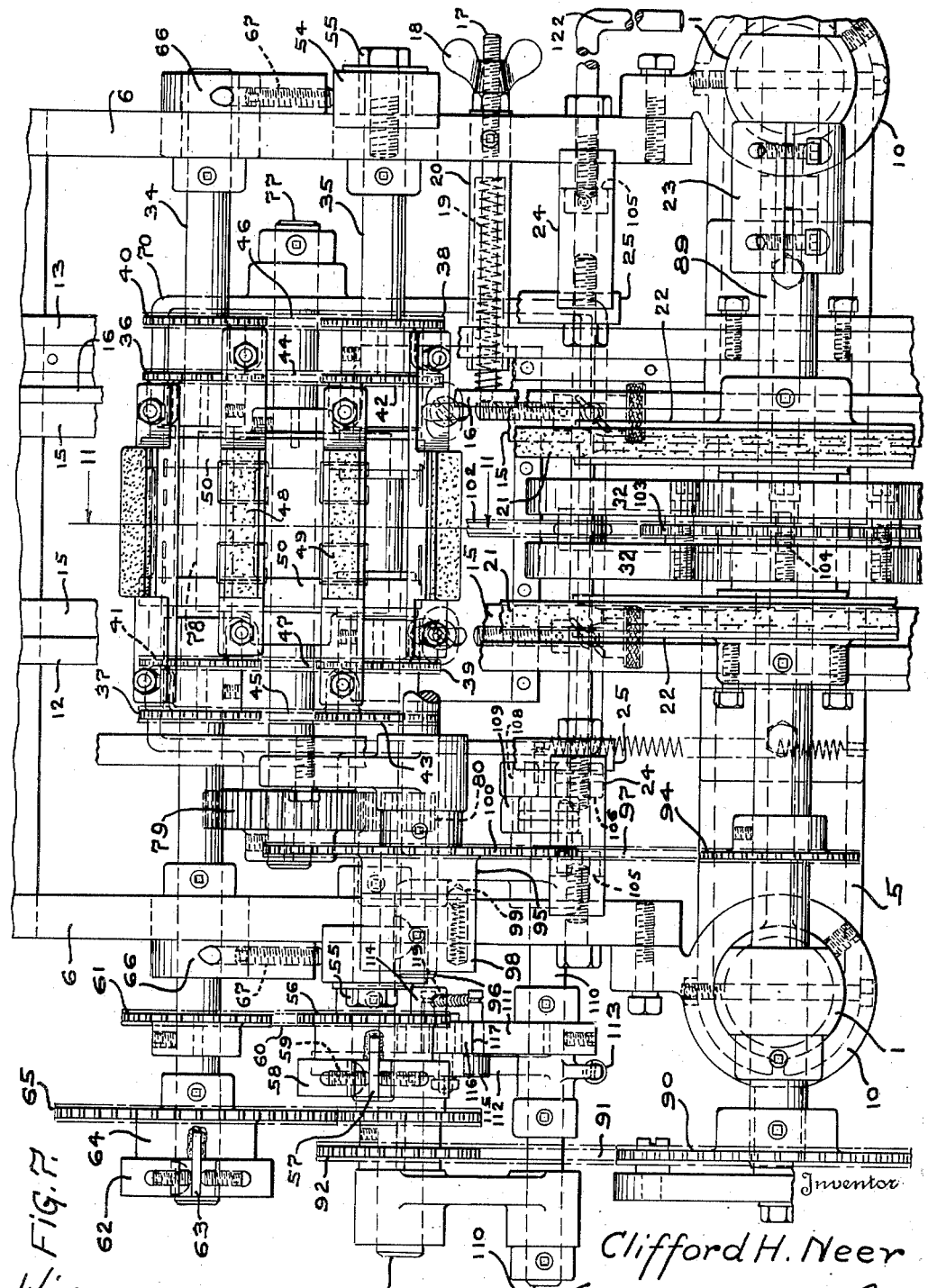

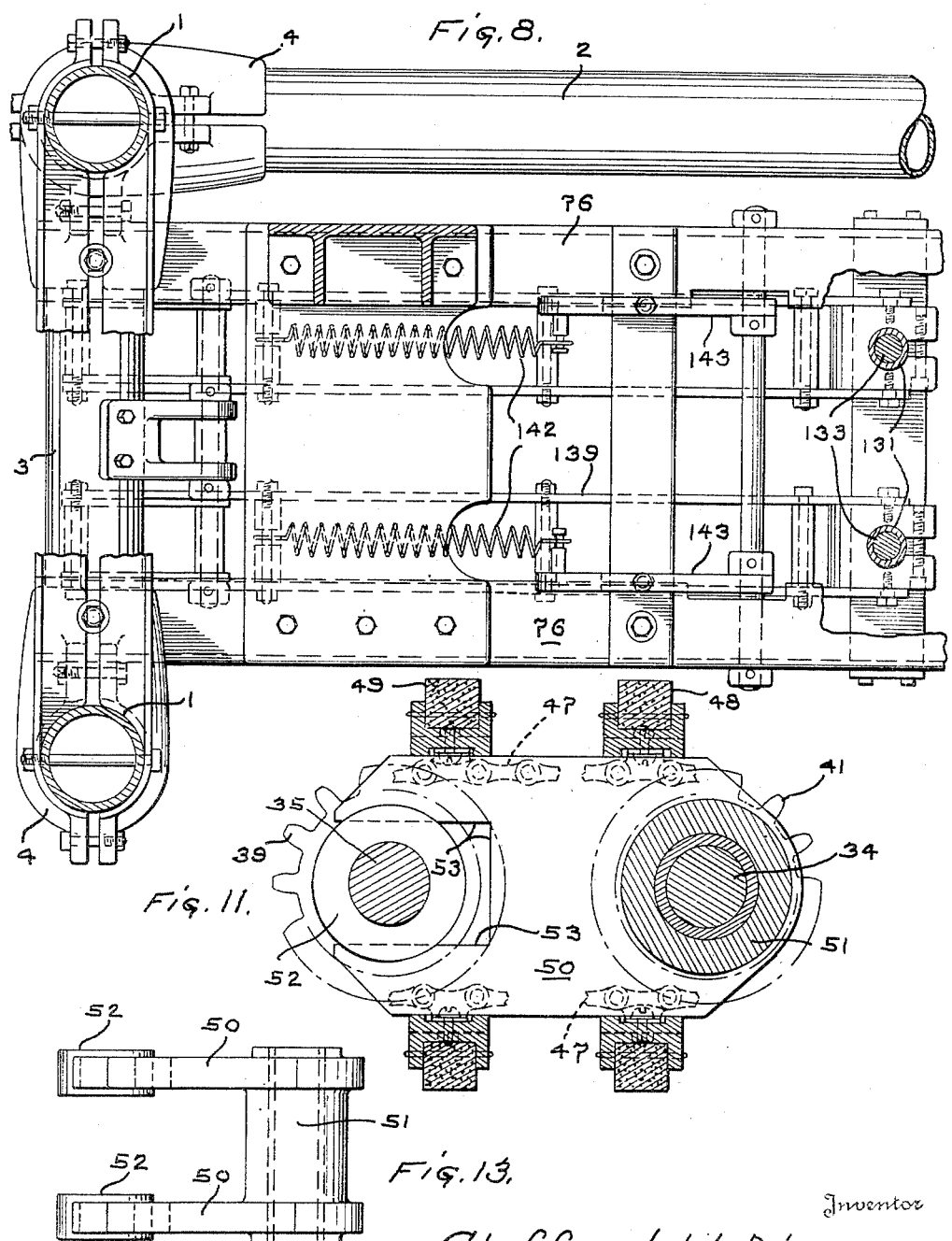

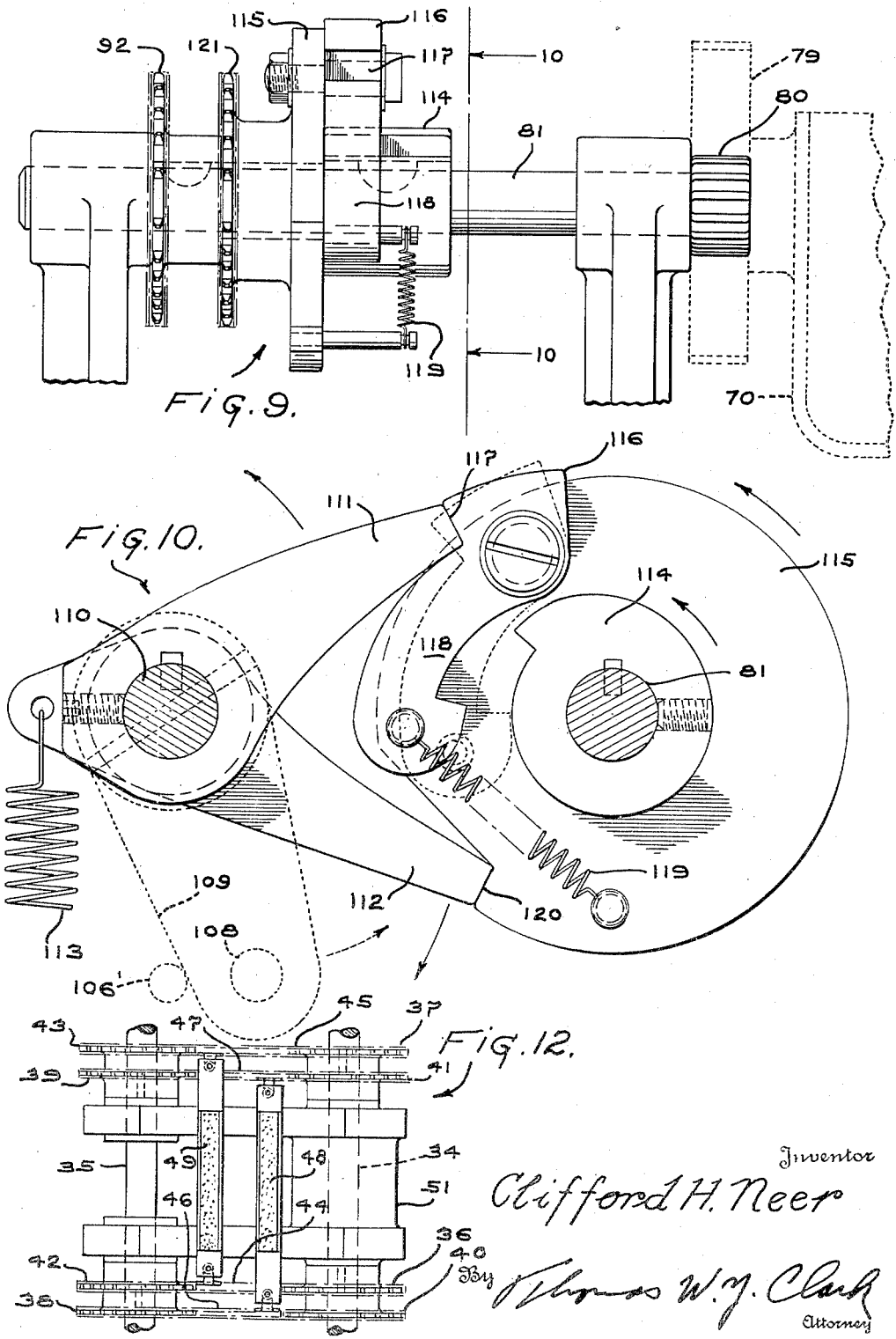

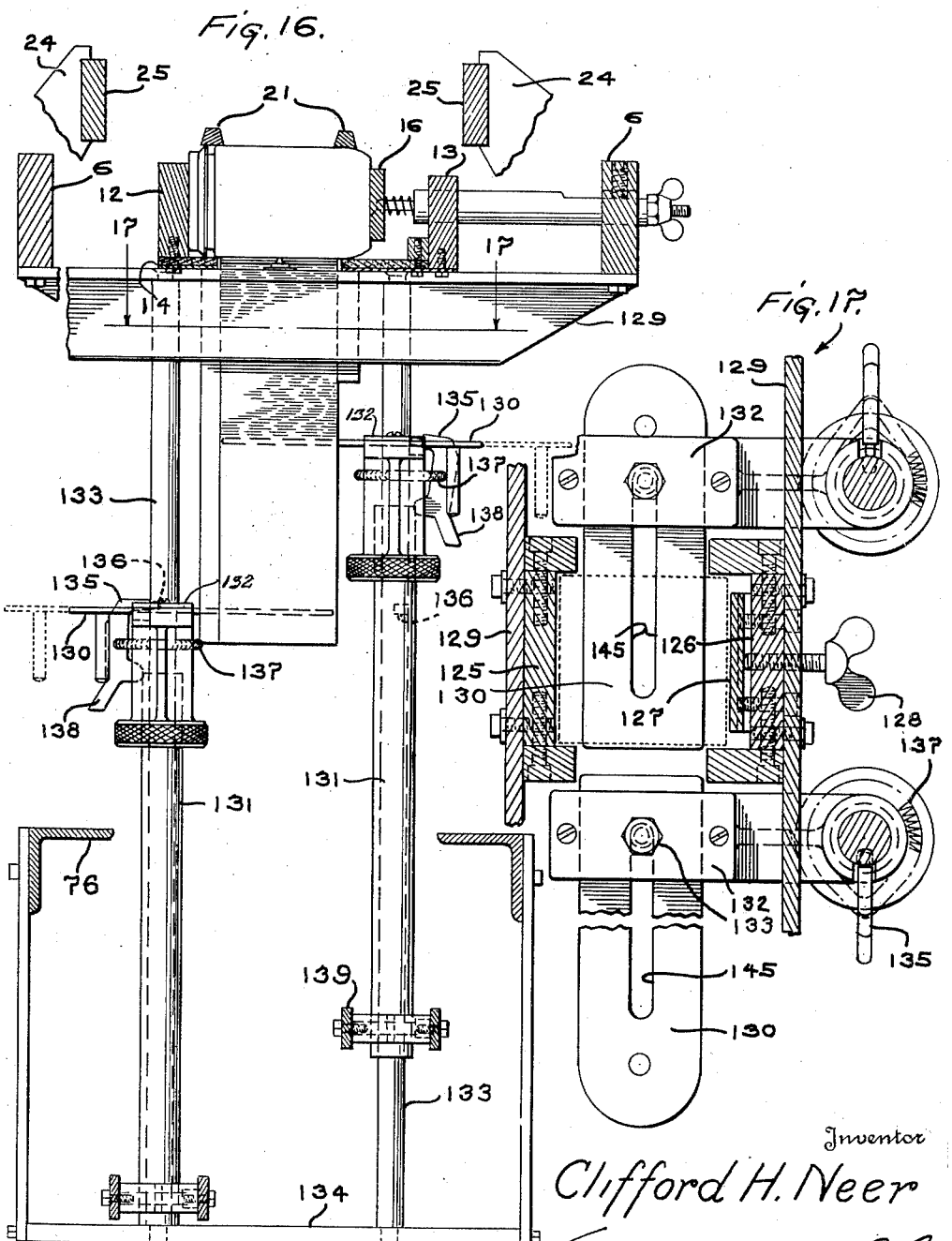

PANEL LABELING MACHINE

Clifford H. Neer, Baltimore, Md., assignor to Burt Machine Company, Incorporated Application January 13, 1945, Serial No. 572,702

17 Claims. (Cl. 216—58)

This invention relates to a labeling machine for cylindrical packages and particularly to a machine in which the packages are rolled through the machine with their axes horizontal.

Important features of the invention relate to the application of labels which are generally referred to as panel labels which are essentially shorter than the length of the circumference of the package. Such labels do not overlap at their ends and must, therefore, be attached to the containers at both leading and trailing ends of the label.

In the affixing of panel labels, as distinguished from the lap end types of labels, close adhesion to the package or container of the opposite leading and trailing ends of the label is of primary importance, the contact of the adhesive with the intermediate portions of the labels being, at least, non-essential.

In order to provide with certainty for the spotting of the containers in correspondence with the end areas of the labels, the machine illustrated shows the adhesive applying pads arranged in pairs so that the edges of the pads which are outer-most in the direction of the circumferential length of the labels are spaced apart according to the length of the labels in the direction stated. While various features of the invention are usable in apparatus in which the portion of the container corresponding to the intermediate portion of the label may also be coated, the arrangement shown is believed to be more economical of adhesive and to attain a more attractive appearance of the label.

In accordance with the operation of the machine of the invention in the preferred form, the containers are thus spotted with adhesive as to areas, the over all dimensions of which, in the direction of the circumference, correspond closely to the length of the labels.

As aforesaid, the packages are rolled through the machine over the adhesive coating pads, being turned or rotated with substantially precise uniformity in relation to their advancement. For this purpose any suitable means as a feed belt and an opposed path may be provided. The path having a frictional tendency to such an extent as to prevent slippage of the containers on the path and the label presenting mechanism being spaced rearwardly of the spotting station where the adhesive is applied, by a distance equal to or closely corresponding to the circumference of the packages. In this way, precise registration of the spotted areas with the labels is obtained.

In the form of machine shown other features which are helpful in securing the desired result are included, for example, the labels after being picked up may be pressed and smoothed down by the operation of a relatively slow motion belt which rolls the packages and particularly the applied labels in contact with a pressing pad. In this way or in any suitable manner, the smoothing and laying of the labels is completed and the packages are delivered continuously and to best advantage at a relatively slow speed which prevents bumping and injury to the containers and labels. The terms package and containers are used interchangeably.

The satisfactory application of panel labels in and by the type of machine in which the containers are rolled through the machine in contact with the active agencies is regarded as a new accomplishment which gives an output per machine which is approximately twice the output of the previous machines for applying panel labels. Machines for this purpose insofar as they have been in use have been mainly of the type in which the containers are moved through the machine with their axes upright. The previous machines were not only slower in their operation but more expensive and of greater length requiring approximately twice the factory space occupied by the present machine.

The features of the machine are subject to variation and rearrangement and the success of the present machine may not be attributable entirely to any one of the units or agencies of which it is composed, but the arrangement in connection with other agencies of the adhesive spotting mechanism, whereby the adhesive is applied to the containers is accurately limited as to each container to one or more areas, the dimension of which is equal to the corresponding dimension of the labels and whereby said areas are caused to register with the labels, is of primary importance.

In the form of adhesive applying or spotting mechanism shown, there is a plurality of sets of pad units each of which units is presented in turn in the path of the containers for the application of the adhesive to a corresponding container, the spotting mechanism being, as already pointed out, so controlled that the adhesive is applied with substantial accuracy to an area or to spaced areas, the overall dimension of the coated area on each container measured in the direction of the circumference of the container being limited to the corresponding dimensions of the panel labels to be employed. The phrase overall dimension may be defined as meaning the distance between the opposite and most remote outside edges of whatever portion of the surface of a container is coated with adhesive, without regard to continuity of coating.

A plurality of these pad units is provided which are moved successively into and out of the container path, one unit being located adjacent the paste pot, as another unit is presented in the path of the containers. In the form of machine shown, a series of these units is mounted on moving endless supports, and the supports are operated with an intermittent motion bringing each unit successively into container contacting relation with the path of the containers. Such operation may be accomplished by means of a continuous power drive, which includes a clutch element which permits the carriers to stop in a series of positions in each of which the pad unit which is to apply adhesive is in the path of the packages.

In the preferred form of the machine, as shown, the carriers, through their drive, are automatically locked in each adhesive applying position above described, being released after each spotting operation by means of a trigger which is engaged by each container in turn or otherwise timed with the containers whereby after each container is spotted, a newly coated spotting unit is presented in the path of the next container.

In view of the importance of confining the adhesive to a precisely determined area on each package, it is of importance that the adhesive applying roll is controlled by a suitable mechanism whereby the roll is held out of contact with the spotting pads in each position of rest.

It is also noted as contributing to the improved operation attained that the label clips have been rearranged and improved to give precision and certainty in the retention and release of the labels of the short lengths employed in panel labeling and that improved means have been provided for the laying and smoothing the labels on the package. Also the label box is provided with a continuous feed which is not disturbed by adjustment along the machine to meet the requirements of containers of different diameters.

Other important features of the machine will be discussed and those referred to above will be further discussed in connection with the drawings.

In the accompanying drawings, a machine embodying the features of the invention in the preferred form is illustrated.

In the drawings:

Figure 1 is a fragmentary elevation of the machine looking from the right side of the machine as determined by the operator standing at the infeed end, the central portion of the machine being broken away.

Figure 2 is a corresponding elevation of the central portion of the machine.

Figure 3 is a corresponding elevation of the delivery end of the machine.

Figure 4 is a fragmentary elevation of the machine looking from the left side, opposite to Figure 1.

Figure 5 is a front elevational view partly in section.

Figure 6 is a transverse sectional view on line 6—6 of Figure 2.

Figure 7 is a fragmentary plan view of the infeed end of the machine with some parts broken away.

Figure 8 is a horizontal sectional view substantially on line 8—8 of Figures 1 and 2.

Figure 9 is a fragmentary side elevation of the drive for the spotting mechanism.

Figure 10 is a sectional view thereof on line 10—10 of Figure 9.

Figure 11 is a sectional view of the spotting pad units on line 11—11 of Figure 7.

Figure 12 is a top plan view of the spotting pad mounting.

Figure 13 is a top plan view of the spotting pad guides.

Figure 16 is a vertical sectional view on line 16—16 of Figures 1 and 2, some parts being omitted.

Figure 17 is a horizontal sectional view on line 17—17 of Figure 16.

In the drawings the numerals refer to the same parts throughout the several views.

Figure 14:
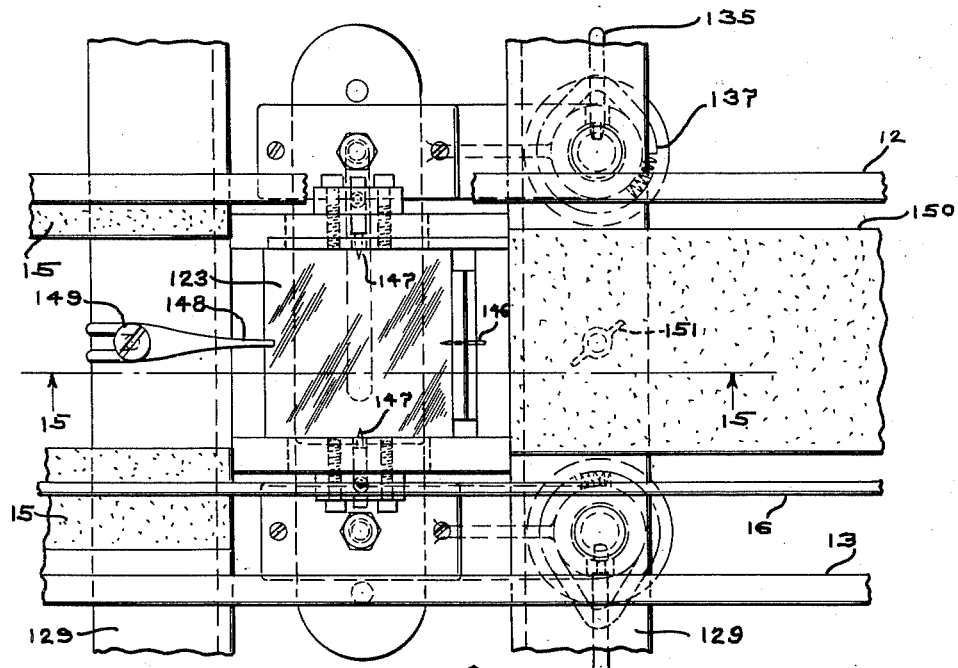
Figure 14 is a top plan view of the label delivery mechanism.
Figure 15:
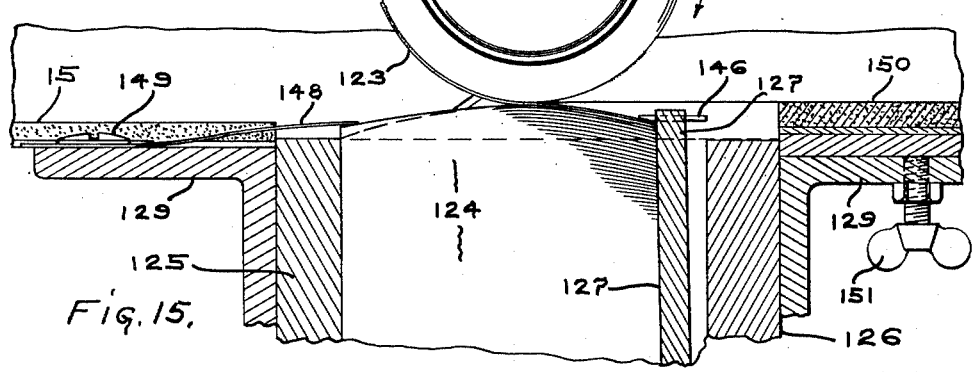
Figure 15 is a longitudinal sectional view on line 15—15 of Figure 14.

Legs or uprights 1 are held in vertical position by longitudinal tubular bars 2 and transverse tubular bars 3 both held adjustably on the legs 1 by split T collars 4. Upper transverse channels 5 are on the forward and rear legs 1 and on the rear legs support longitudinal rails 6. These rails 6 are likewise held at their forward and rear ends by collars 10 on legs 1.

The channels 5 also support angles 11. On the left side of the machine these angles support guides 12 and on the right side rails 13. These guides and rails extend beyond the rear legs 1 and are held up at their rear ends by bracket 7, bar 8 and bracket 9 screwed to the rear tubular bar 3. Guides 12 and rails 13 respectively support sections of the bed or path 14 to carry cylindrical packages or containers. The forward bed or path sections are preferably covered with rubber 15 or similar padding over which the packages roll without slipping. To accommodate packages of various lengths guide 16 on the right side of the machine is held by rods 17 in transversely adjustable position by means of wing-nuts 18 and springs 19 carried in supporting tubes 20. The guide 16 forms with guide 12, a yielding way for the packages.

The packages are rolled along the bed 14 by means of belts 21 engaging them near their ends as shown in Figures 5 and 6. These belts are supported in forward and rear pulleys 22 on shafts 88 and 89, which may each be broken and joined by collars 23, so that on removal of the collars, the belts may be removed, or new ones placed on the pulleys.

Supported by brackets 24 on rails 6 are upper longitudinally extending rails 25 which hold pulley brackets 26 pivoted at one end thereon and carrying at the opposite end the pulleys 27. These pulleys 27 are held yieldingly down against the belts 21 by springs 28 and the pulleys thus hold the belts firmly down against the containers or packages being rolled or propelled thereby. Belt tighteners 29 are held in brackets 30 on rails 25 yieldingly against the top of the belts by springs 31.

Containers enter the path formed by bed or tracks 14 in spaced relation, being spaced by a feed wheel 32 and while being spaced by this wheel they roll in chute 33.

Beneath the rails 6 and mounted in brackets supported therefrom are shafts 34 and 35, extending transversely across the machine and having thereon sprockets 36 and 37 keyed to shaft 34, 38 and 39 keyed to shaft 35 and 40 and 41 free to rotate on shaft 34 and 42 and 43 free to rotate on shaft 35. Sprockets 36 and 42 are connected by drive chain 44, sprockets 37 and 43 are connected by driving chain 45, sprockets 40 and 38 are connected by driving chain 46, and sprockets 41 and 39 are connected by driving chain 47. The keyed sprockets by means of these chains drive the freely rotating sprockets. On chains 46 and 47 are mounted a plurality of spotting pads 48 and on chains 44 and 45 are spotting pads 49. Pads 48 are spaced alternately with pads 49 and two adjacent pads form a spotting unit. The chains are held extended in their parallel position between their respective sprockets by means of guides 50. These guides are mounted on shafts 34 and 35, on shaft 34 by a hub 51 connecting the two guides and on shaft 35 by bearings 52 having flat surfaces above and below that slide in the U-shaped opening 53 in the ends of the guides 50. This construction allows for moving the shafts 34 and 35 relative to one another so that a link could be removed from each of the chains for adjustment of the spacing of the spotting pads around the length of the chains.

Shaft 35 is mounted in bracket 54 which may be moved longitudinally of the machine by loosening and tightening bolts 55 in rails 6 in the slots in the brackets 54.

Back of the glue spotting station and removed a fixed amount therefrom is the label applying station. It is important that these two stations be removed from each other a fixed distance longitudinally of the machine and it is preferred that this distance be exactly the circumference of the package being labeled from center to center of the respective stations. It is likewise important that the glue spots be placed very near the position on the package where the circumferential, or leading and trailing ends of the label will contact them. In order to provide the spotting mechanism above described for use with labels of different circumferential length the spotting pads must be adjustable longitudinally of the machine as to the spacing of the pads of each co-operating pair to correspond to the length of the label without disturbing the relative position of the point of first glue pick-up with respect to the leading edge of the labels in the label stack.

To obtain the proper spacing of the pads 48 of that group whose driving sprockets are keyed to shaft 35 in relation to the pads 49 of the other group a sprocket 56 is freely mounted on the shaft and has a key 57 projecting laterally from its hub.

Collar 58 is keyed to shaft 35 and has therein, on both sides of key 57, set screws 59. This key 57 has free play in a segmental opening cut in the collar 58 and the extent of movement allowed for key 57 by this segmental opening in the collar 58 allows substantially the same adjustment to the spacing of pads 48 as would be allowed for adjustment of these spotting pads on their supporting chains as a distance of one link in these chains. For adjustments of less than one link the key 57 can be moved back or forth in the collar 58 by means of the set screws 59 so that the group of pads 48 can be accurately placed on its supporting chains in relation to the other group 49 so that the glue spots made by any two pads, constituting a unit, will come precisely where desired in relation to the over all length of the label at the label applying station.

Adjustments are made as above described for one group of spotting pads. This adjustment is really an adjustment of one group of pads carried by one pair of chains in relation to the other group of pads carried by the other pair of chains so that adjustment of the other pair of chains, that is independent of the drive of shaft 34, must also be made, to place the two glue spots on the package at the proper place in relation to the later to be applied label. The two shafts 34 and 35 are connected by a drive chain 60 which passes over the sprocket 56 on shaft 35 to the fast or keyed sprocket 61 on shaft 34, so that after once fixing the location of key 57 in collar 58, the two pairs of chains will rotate together in the adjusted fixed relative relation for the pads carried alternately by each set of chains. Shaft 34 has keyed thereon collar 62 likewise provided with a segmental opening in which key 63 is free to rotate a distance corresponding approximately to the length of one link in the pad carrying chains. This key 63 is fast in hub 64 integral with driving sprocket 65. By means of this last adjustment the proper location of two spotting pads forming a unit may be attained to place the glue on the package at the proper place in relation to the later to be applied label.

To allow for tightening of the carrier chains the brackets 66 carrying shaft 34 may be moved slightly longitudinally of the machine by means of screws 67 in these brackets 66. After the shaft 34 is properly located by means of screws 67, the bracket 66 is held on bracket 54 by bolts 68 passing through slotted openings 69 in brackets 54.

It will be apparent that slight longitudinal adjustments of the spotting station may be made by adjustment of brackets 54 on rails 6 since that adjustment carries both shafts 35 and 34.

Glue is applied to the pad groups 48 and 49 from the pot 70. This pot is mounted on platform 71 and is held down thereon by screws 72 and adjusted upwardly therefrom by screws 73. These two sets of screws allow for accurate adjustment of the elevation of the pot 70. The support 71 for the pot slides on rods 74 fixedly mounted in bracket 75 carried on lower angles 76 extending longitudinally of the machine from lower channels 5. The pot has therein a shaft 77 which has keyed thereto glue applying roller 78. Shaft 77 also has keyed thereon gear 79 which is driven by pinion 80 on shaft 81. The pot may be moved transversely of the machine on rods 74 and in such movement the gear 79 simply slides from pinion 80. This movement laterally of the machine allows for cleaning of the pot and when it is returned in place it is fixedly secured therein by a wing screw 82.

The machine is driven through means of a motor 83 and is provided with speed reducing belt and pulley 84 which drives pulley 85 on the shaft of pulley 84, and which in turn drives belt 86 driving in its turn pulley 87 fast on shaft 88. Rear pulleys 22 also fast on shaft 88 and carrying belts 21 in turn drive the forward pulleys 22 fast on shaft 89. Also fast on shaft 89 and driven thereby is sprocket 90 and this sprocket by means of chain 91 continuously drives sprocket 92 on shaft 81. By this drive, whenever the machine is in operation belts 21 are moving and prepared to move containers through the machine at the same time the glue pot roller is constantly rotating and so is the shaft 81 driving that roller. A slack take-up sprocket 93 is provided for chain 91.

The position of the roller 78 between two adjacent pads of groups 48 and 49 is such that in positions of rest of the pads when a package may be passing over an upper pair of pads the roller 78 is free from contacting any lower pads. That is in a position of rest when the pads are not moving the roller is in contact with no pad and rotates freely and is constantly lifting up a new supply of glue for the next movement of the pads. As packages are allowed to come down the chute 33 they are met by spacing wheel 32 and spaced by the pockets in the wheel. The wheel is constantly driven but it may be stopped due to the misplacement of a package in one of its pockets.

The impositive drive of wheel 32 mounted on shaft 89 is obtained from the positive drive of shaft 89 and sprocket 94 thereon driving hub 95 by means of integral sprocket 100, mounted to freely rotate on shaft 96 by means of the chain 97. Keyed to this shaft 96 is hub 98 having a spring pressed ball 99 in its face engaging with a socket in the hub 95. Also keyed to the shaft 96 is a sprocket 101 driving chain 102 which in turn drives sprocket 103, driving the spacing wheel 32. Should a package or container be misaligned in the pockets of wheel 32 the ball 99 will be forced from its socket and allow the rest of the machine to proceed while the spacing wheel 32 stops and it will remain stopped until the operator removes the obstruction from its pocket.

As the containers are slid down the chute 33 spaced by the wheel 32 they trip arm 104 in their path by bearing down on the arm. The arm is pivoted in a bracket 105 on rails 6 and it has an extending arm 106 having a longitudinal slot 107 in the lower end thereof. This slot 107 fits over pin 108 on arm 109 keyed to shaft 110 so that the tripping of the lever 104 rocks the shaft 110.

Keyed to shaft 110 is pawl 111, see Fig. 10. Freely mounted on shaft 110 is finger 112 which is held up by the spring 113. Shaft 81 is continuously driven and it rotates continuously collar 114 keyed thereto. Freely mounted on shaft 81 is a hub with an integral plate 115 thereon and this plate has on its face, pivoted on a bolt, dog 116 having a shoulder 117 engaged by pawl 111 when arm 109 is in its lowermost position. In this position the arm 104 is not tripped by a package and the plate 115 is stationary and held so by pawl 111 and finger 112. When the pawl 111 is raised by the tripping of arm 104 the lower end 118 of the dog 116 falls and is drawn inwardly toward shaft 81 by spring 119 on plate 115 so that the dog engages the notch of collar 114, and the collar, by rotating, drives the plate 115 around counter-clockwise one revolution. In the meantime the package has passed over the arm 104 and allows the pawl 111 to fall into the path of shoulder 117 of dog 116. Coming around with some speed causes the dog 116 to engage the pawl 111 with such force that the plate 115 would tend to rebound except for the fact that finger 112 falls into notch 120 cut in plate 115.

This one revolution of plate 115 imparts to sprocket 121 also on hub 115 one revolution and this one revolution in turn imparts one-half a revolution to sprocket 65 fast to shaft 34 and drives the pads forward so that two wet pads are in position for the approaching package to apply glue spots to its surface. By this means the spotting pads are moved forward to move up a fresh set of pads with each tripping of lever 104. Arm 106 may also be tripped by hand, by lever 122. The arm 106 is held back against stop 106' by spring 106'', so that the pawl 111 engages dog 116.

The package now has on it two spots of glue spaced precisely so that with one complete revolution of the package the circumferential center of the two spots of glue will arrive exactly at the center of the label applying station and there the two spots of glue will pick up the top label 123. The pack of labels 124 is held in vertical guides 125 and 126. The guide 126 has an adjustable plate 127 in its rear held in close position with the stack of labels by a wing screw 128. These guides 125 and 126 are suspended from transverse angles 129 on rails 6.

Two independent packs of labels, moving in the same path, are held in their upward vertical position by means of plates 130, each of which is mounted at the top of a tube 131 and held by top plate 132, the tube sliding on rod 133 suspended from transverse angles 129 and mounted at their lower ends in brackets 134 suspended from lower angles 76. The tubes 131 may be held in a fixed vertical position such as shown at the left in Figure 16 in which the dog 135 has its jaw in an opening 136 in the rod 133. The dog is held in a vertical slot in the upper end of tube 131 by spring ring 137, and the dog may be removed from this gripping position by pressure on its lower end 138. It is shown removed from the gripping position at the right in Figure 16. In this position, shown at the right in Figure 16, the plate 130 is holding a stack of labels and it is held yieldingly upwardly by means of the tube 131 and arms 139 pivoted to the lower end of the tubes. These arms are in turn pivoted at their forward ends to links 140, which are pivoted to brackets 141 on forward tubular crossbar 3.

The arms 139 are held upwardly yieldingly by means of springs 142 suspended from brackets 143 pivoted to the lower side of angles 76 and the tension of the springs may be adjusted by screws 144. By means of these springs constant upward tension is applied on both of the plates 130 and only the one free to move on its rod 133, by the release of the dog 135, is in operation.

The plates 130 have a long slot 145 therein so that the plates may be slid longitudinally, on the rods 133 between the top of tube 131 and plates 132 thereon. The upper operating plate 130 on the right in Figure 16 is holding a stack of labels yieldingly against holding fingers in the top of the label delivery mechanism. When one plate 130 is thus in operation the other plate is in its lower position and ready to receive thereon a new supply of labels as shown at the left in Figure 16. When this new supply of labels is introduced the dog may be released and the spring will bring the supply up against the underside of the other plate 130 and when the supply on that plate is nearly exhausted the plate is removed by movement longitudinally and the new supply comes into use, supplementing the old.

The means at the top of the label applying mechanism to hold the top label in readiness for the approach of the container comprise a rear finger 146 on the adjustable plate 127, side knife edges 147 holding the labels gently and forward spring finger 148 adjustably held by screw 149 which is pressed down by a package and springs up to release the top label when glue on the passing container tends to raise it.

Back of the label applying mechanism the bed or tracks 15 are replaced by a solid rubber bed 150 as shown in Figures 6 and 14, adjustable in elevation by wing screws 151. This solid bed preferably made of sponge rubber, securely presses the label smoothly against the package and the package as thus labeled passes from the main portion of the machine to the rear portion shown in Figure 3 where the bed is of the same construction but the top or moving belts are replaced by a single solid belt 152 mounted on pulleys 153 and 154 and held taut thereon by slack take-up mechanism 155 and held downwardly thereon by pressure rollers 156 extending all the way across the single belt 152, but held in brackets on rails 25 similar to the single pressure pulley brackets 26. Pulley 153 mounted on shaft 157 is driven from that shaft by sprocket 158, chain 159 and sprocket 160 fast to driven shaft 88.

It will be noted in Figure 2 that the drive of shaft 157 is much reduced in speed to that of shaft 88. This allows the packages to remain between the pressure of belt 152 and its pressure rollers 156, and bed 150, for a considerable period of time, to press the labels smoothly in place and allow the glue to dry.

The operation of the machine will be apparent from the above description. It will likewise be apparent that many modifications may be made in the structures described without departing from the invention, the preferred form having been shown.

What is claimed as new and is desired to be secured by Letters Patent is:

1. In a machine for affixing panel labels to cylindrical packages, means for advancing the packages along a longitudinal path with a predetermined rotary motion for each unit of advancement, means for presenting panel labels in the path of the packages and adhesive applying means in said path in advance of said presenting means and spaced therefrom a distance proportional to the circumference of the packages and means to vary said spacing for packages of different circumferences, said applying means comprising a plurality of spaced units on endless carriers, each pad unit having an overall dimension in the direction of advancement in close correspondence with the length of the panel labels in the same direction.

2. In a machine for affixing panel labels to cylindrical packages, means for advancing the packages along an elongated path, with a rotary motion and means in said path for applying adhesive to the packages, said applying means comprising a plurality of spaced pad units on endless carriers each pad unit having an overall dimension in the direction of advance in close correspondence with the length in the same direction of labels to be applied, means for moving each said unit into and out of said path and means for applying adhesive to each said unit when removed from said path.

3. In a machine for affixing panel labels to cylindrical packages, means for advancing the packages along a longitudinal path with a rotary motion and means in said path for applying adhesive to the packages, said applying means comprising pad units having an overall dimension in the direction of advance in close correspondence with the length in the same direction of labels to be applied, means for moving said units successively into and out of said path with a step by step motion, means for supplying adhesive to said units when removed from said path and means for holding said units and supplying means out of contact between said steps.

4. In a machine for applying panel labels to cylindrical packages, means whereby the packages are rolled through the machine on a longitudinal path and means operating in said path at a station for applying adhesive to packages passing along said path, said adhesive applying means comprising driven endless carriers, a plurality of adhesive pad units spaced along the length of said carriers, means for driving said carriers and locking means for holding the carriers in a plurality of successive positions of rest in each of which one of said pad units is at said station in the path of said packages, and means operated upon the approach of packages whereby the lock is released and further driving is initiated after the passage of each preceding package past said station.

5. In a machine for applying panel labels to cylindrical packages, means whereby the packages are rolled through the machine on a path and means for applying adhesive to the packages passing along said path, said adhesive applying means comprising endless carriers having a plurality of adhesive pad units spaced along the length of said carriers, means for driving said carriers and stopping them in a plurality of positions of rest in each of which one of said pad units is in the path of said packages, said units being presented successively, and means for supplying said pad units with adhesive and means for holding said supplying means out of contact with the pad units when the carriers are at rest.

6. In a machine for applying panel labels to cylindrical containers having means for rolling the containers along a predetermined path, endless carriers having adhesive pad units spaced thereon, means for driving the carriers with a step by step motion, bringing each unit successively into the path of the containers, at a spotting station, means for locking the carriers in each of a series of positions in each of which a corresponding pad unit is in the path of the containers at said station, said units having an overall dimension in the direction of the length of the path corresponding to the length of labels to be applied, means for coating the pad units with adhesive, and means for holding the coating means out of contact with the pads in the stationary positions of the carriers.

7. In a machine for applying panel labels to cylindrical containers having means for rolling the containers along a predetermined path with a uniform rotation to each unit of advancement, endless carriers having adhesive pad units spaced thereon, means for driving the carriers with a step by step motion, bringing each unit successively into the path of the containers, at a spotting station, means controlled by the containers for locking the carriers in each said position with a corresponding unit in the path of the containers, a label pack for panel labels in operative relation to the path of the containers and spaced beyond the spotting station by a distance corresponding to the circumference of the packages being labeled, said units having an overall dimension in the direction of the length of the path corresponding to the length of the panel labels, means for coating the pad units with adhesive, and means for holding the coating means out of contact with the pads in the stationary positions of the carriers, and means beyond the label pack for smoothing the panel labels and delivering the containers at reduced speed.

8. In a machine for applying panel labels to cylindrical packages having means for rolling the packages along a predetermined path and means for applying adhesive to the packages at a station in said path, said adhesive applying means comprising endless carriers, adhesive applying pad units spaced along said carriers and conforming in their dimensions longitudinally of the path to the length of the labels to be applied, means for moving the carriers at intervals to present each adhesive applying unit in turn at said station in the path of the packages, 9. In a machine for applying panel labels to cylindrical packages having means for rolling the packages along a predetermined path means for applying adhesive to the packages at a station in said path, said adhesive applying means comprising endless carriers, adhesive applying pad units each unit comprising two pads, spaced along said carriers and each unit conforming in its dimensions longitudinally of the path to the length of the labels to be applied, means for moving the carriers at intervals to present each adhesive applying unit in turn at said station in the path of the packages, and means for moving the alternate pads independently of the others in the direction of said path to provide for adjusting the units to the length of labels to be applied.

10. In a machine for applying panel labels to cylindrical packages having means for rolling the packages along a predetermined path and means for applying adhesive to the packages at a station in said path, said adhesive applying means comprising endless carriers, adhesive applying pad units spaced along said carriers and conforming in their dimensions longitudinally of the path to the length of the labels to be applied, means for moving the carriers at intervals to present each adhesive applying unit in turn at said station in the path of the packages, and means limited to contact with the pad units only when the carrier is in motion for applying adhesive to the pads.

11. In a machine for applying panel labels to cylindrical packages having means for rolling the packages along a predetermined path extending longitudinally of the machine, means for spotting adhesive on the packages at a station in said path, said adhesive applying means comprising endless carriers, adhesive applying pad units spaced thereon, means for driving said carriers with a step by step motion and an actuating member therefor having a continuous power drive with a clutch connection for driving said driving means, said driving means being adapted to move the carriers to bring each adhesive applying unit in turn into the path of the packages, and locking means for said carriers having a control for locking said carriers after each motion thus positioning an adhesive applying unit at said station and means for releasing the carriers for advancement after each container has passed from operative relation to a corresponding pad unit.

12. In a machine for applying labels to cylindrical packages having means for rolling the packages along a path, means for applying adhesive at a station in said path, said adhesive applying means comprising endless carriers, adhesive applying units spaced thereon, means for driving said carriers with a step by step motion, comprising engaging members and a continuous power drive, and means to cause the engagement of said members, said driving means being adapted to move the carriers to present each adhesive applying unit in turn in the path of the containers, and locking means for said carrier driving means having a control for locking said driving means after each motion and positioning an adhesive applying unit at said station and means for releasing the driving means for advancement of the carriers after each package has passed from operative relation to the unit, and adhesive coating means for said pad units.

13. In a machine for applying panel labels to cylindrical packages having means for rolling the packages along a predetermined path, and adhesive applying means in said path, said adhesive applying means comprising endless carriers having pad units thereon, means for driving said carriers, means tending to hold and to locate the carriers in successive positions of rest in each of which one of said pad units is in operative relation to the path of the packages, and means timed with the rolling of the packages whereby the carriers are actuated for further driving to bring another pad unit in operative position as each package passes the adhesive applying unit.

14. In a machine for labeling cylindrical packages, means for rolling the packages along a path, an adhesive spotting means in operative relation to said path and means for driving said spotting means with a step by step motion, means for applying adhesive to the said spotting means and means for holding said spotting means out of contact with said applying means between said steps.

15. In a machine for applying panel labels to cylindrical packages in which the packages are advanced along a predetermined path by rolling, said machine having means for presenting a pack of labels in said path, and a spotting station in said path preceding said presenting means, adhesive applying units, each unit comprising pads spaced in the direction of said path so that the overall dimension of each unit is in substantial conformance with the length of the labels in the same direction, driving means for said units, means for moving said units independently of said driving means, thereby causing the spotted areas on the successive packages to register with each top label in turn in said pack.

16. In a machine for affixing panel labels to cylindrical packages, a frictional track and a belt for rolling the packages along said track, means for presenting labels in the path of the packages and adhesive applying means in said path in advance of said presenting means and spaced therefrom by the circumference of the packages, means to adjust the spacing of the adhesive applying means from the label presenting means to conform to the circumference of the packages being labeled, said applying means comprising a plurality of spaced pad units on endless carriers, one unit for each package, each pad unit having an overall dimension in the direction of advancement in close correspondence to the length of the labels in the same direction and means providing for the adjustment of the pad units as to said overall dimension, to the length of the labels.

17. In a machine for applying panel labels to cylindrical packages in which the packages are advanced along a predetermined path by rolling, said machine having a spotting station in said path, comprising adhesive applying units, each unit having pads spaced in the direction of said path so that the overall dimension of the unit is in substantial conformance with the length in the same direction of the label to be applied, means to move one of the pads in a unit independently of another pad of the same unit to vary the spacing of the spots of that unit to fit a label of different size.

CLIFFORD H. NEER.

REFERENCES CITED

The following references are of record in the file of this patent:

UNITED STATES PATENTS

| Number | Name | Date |
| --- | --- | --- |
| 185,719 | Bigelow | Dec. 26, 1876 |
| 820,804 | Lucy | May 15, 1906 |
| 1,037,220 | Duffy | Sept. 3, 1912 |
| 2,079,321 | Kyler | May 4, 1937 |
| 2,224,098 | Burke | Dec. 3, 1940 |